(12) United States Patent
Shi et al.

(10) Patent No.: US 9,386,606 B2
(45) Date of Patent: Jul. 5, 2016

(54) METHODS AND SYSTEMS FOR EMBEDDING SUPPLEMENTARY DATA CHANNEL IN LTE-BASED COMMUNICATION SYSTEMS

(71) Applicant: MOTOROLA SOLUTIONS, INC, Schaumburg, IL (US)

(72) Inventors: Qicai Shi, Coral Springs, FL (US); Neiyer S Correal, Cooper City, FL (US); Spyros Kyperountas, Weston, FL (US)

(73) Assignee: MOTOROLA SOLUTIONS, INC., Schaumberg, IL (US)

( * ) Notice: Subject to any disclaimer, the term of this patent is extended or adjusted under 35 U.S.C. 154(b) by 30 days.

(21) Appl. No.: 14/476,372

(22) Filed: Sep. 3, 2014

(65) Prior Publication Data

US 2016/0066350 A1    Mar. 3, 2016

(51) Int. Cl.
*H04W 4/00* (2009.01)
*H04W 76/00* (2009.01)
*H04L 27/26* (2006.01)

(52) U.S. Cl.
CPC ......... *H04W 76/007* (2013.01); *H04L 27/2602* (2013.01); *H04L 27/2626* (2013.01); *H04L 27/2647* (2013.01)

(58) Field of Classification Search
CPC .......... H04L 2025/03414; H04L 27/2607; H04L 5/0007; H04L 27/2601; H04L 27/2602; H04L 27/2613; H04L 27/2692; H04L 27/26; H04L 27/2608; H04L 27/2626; H04W 4/00
See application file for complete search history.

(56) References Cited

U.S. PATENT DOCUMENTS

| | | | |
|---|---|---|---|
| 5,852,630 A | 12/1998 | Langberg et al. | |
| 8,441,917 B2 | 5/2013 | Wu et al. | |
| 8,675,589 B2 | 3/2014 | Ko et al. | |
| 8,693,316 B2 | 4/2014 | Palanki et al. | |
| 2003/0040306 A1* | 2/2003 | Kentaro | H04W 48/12 455/422.1 |
| 2005/0147026 A1 | 7/2005 | Jones et al. | |
| 2009/0103632 A1* | 4/2009 | Choi | H03M 13/27 375/240.25 |

(Continued)

FOREIGN PATENT DOCUMENTS

EP    2292970 A1    11/2012

OTHER PUBLICATIONS

Office Action Dated Mar. 27, 2015 for Related U.S. Appl. No. 14/476,297.

(Continued)

*Primary Examiner* — Olumide T Ajibade Akonai

(57) ABSTRACT

Disclosed herein are methods and systems for embedding a supplementary data channel in LTE-based communication systems. One embodiment takes the form of a process that includes obtaining a primary data signal. The primary data signal includes a given symbol, and the given symbol includes primary payload data prepended with a given cyclic prefix. The process also includes obtaining supplementary payload data. The process also includes generating a modified primary data signal at least in part by replacing an initial portion of the given cyclic prefix with a subset of the supplementary payload data. The process also includes outputting the generated modified primary data signal for transmission via an air interface.

18 Claims, 10 Drawing Sheets

(56) References Cited

U.S. PATENT DOCUMENTS

| | | | |
|---|---|---|---|
| 2009/0270122 A1 | 10/2009 | Chmiel et al. | |
| 2010/0226454 A1 | 9/2010 | Bliss et al. | |
| 2010/0284298 A1 | 11/2010 | Xia et al. | |
| 2010/0299713 A1* | 11/2010 | Salinger | H04N 17/004 725/106 |
| 2011/0039499 A1 | 2/2011 | Zhang et al. | |
| 2014/0179305 A1* | 6/2014 | Singh | H04W 4/005 455/426.1 |
| 2014/0198757 A1* | 7/2014 | Kim | H04W 56/003 370/329 |
| 2014/0226586 A1 | 8/2014 | Kimura et al. | |
| 2014/0254404 A1 | 9/2014 | Ratnakar | |
| 2015/0063162 A1 | 3/2015 | Gacanin | |

OTHER PUBLICATIONS

Bottomley, G.E. and Wilhelmson, L.R., "Recycling the Cyclic Prefix in an OFDM System," 2006 IEEE 64th Vehicular Technology Conference, Sep. 25-28, 2006, VTC-2006 Fall, pp. 1-5.

"Delay Spread," JPL's Wireless Communication Reference Website, Chapter: Wireless Channels, Section: Multipath Fading, © 1993, 1995. Retrieved from the Internet URL: http://www.wirelesscommunication.nl/reference/chaptr03/fading/delayspr.htm, on Feb. 26, 2016, pp. 1-4.

ETSI ITS 136 211 V10.1.0 (Apr. 2011); Technical Specification; LTE; Evolved Universal Terrestrial Radio Access (E-UTRA); Physical channels and modulation (3GPP TS 36.211 version 10.1.0 Release 10), pp. 1-105.

* cited by examiner

METHODS AND SYSTEMS FOR EMBEDDING SUPPLEMENTARY DATA CHANNEL IN LTE-BASED COMMUNICATION SYSTEMS

BACKGROUND OF THE INVENTION

It is important that public-safety responders have a link to communication services (e.g., telephony, data services, and the like) when responding to an incident. However, the reality of the dynamic and mobile nature of the profession is that, in many instances, incidents occur outside the range of the established radio access networks (RANs). To facilitate communication between the responders and offsite utilities, incident area networks (IANs) are often set up using mobile base stations. These mobile base stations establish a link between a given wireless communication device (WCD) (e.g., a handheld mobile radio) and a given network resource, typically using some standard for over-the-air communication, an example of which is 3GPP's Long Term Evolution (LTE), which is one example protocol for a type of wireless communication known as orthogonal frequency division multiplex (OFDM) communication. In addition to mobile radios, some examples of commonly used WCDs include cell phones, smartphones, tablets, notebook computers, laptop computers, and the like. And certainly many other examples of WCDs could be listed as well, as known to those having skill in the relevant art.

It is desirable for public-safety responders to be able to communicate with one another as efficiently as possible for at least the reason that the immediacy and efficacy with which public-safety responders can communicate with one another are quite often determinative of how positive the ultimate outcome of a given incident can be. For the sake of general efficiency and for optimized allocation of network resources, it is important that mobile base stations be coordinated among one another to handle the various connections they facilitate. Accordingly, for this reason and others, there is a need for methods and systems for embedding a supplementary data channel in LTE-based communication systems.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
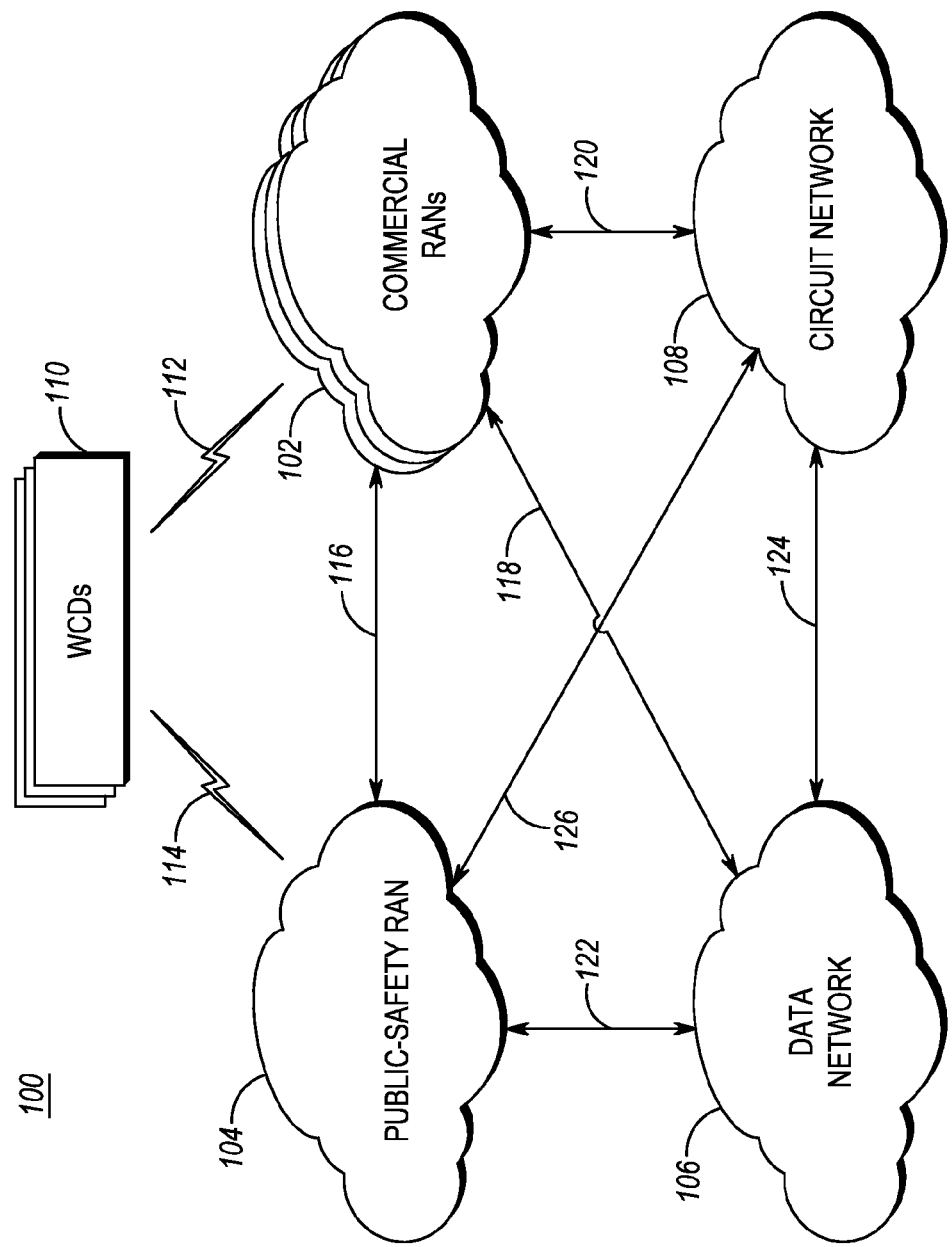
FIG. 1 depicts an example communication system, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for embedding a supplementary data channel in LTE-based communication systems. One embodiment takes the form of a process that includes obtaining a primary data signal that includes a given symbol, where the given symbol includes primary payload data prepended with a given cyclic prefix. The process also includes obtaining supplementary payload data. The process also includes generating a modified primary data signal at least in part by replacing an initial portion of the given cyclic prefix with a subset of the supplementary payload data. The process also includes outputting the generated modified primary data signal for transmission via an air interface. Moreover, it is explicitly noted that, although the title of this disclosure mentions LTE-based communication systems, the present methods and systems are applicable to any suitable OFDM-based communication systems.

Another embodiment takes the form of a system that includes a communication interface, a processor, and data storage containing instructions executable by the processor for causing the system to carry out at least the functions described in the preceding paragraph.

Another embodiment takes the form of a process that includes receiving via an air interface a modified LTE signal that includes a symbol. The symbol is prepended with a shortened cyclic prefix that is preceded by supplementary payload data. The process also includes extracting the symbol from the received modified LTE signal, and outputting the extracted signal as received LTE traffic. The process also includes processing the supplementary payload data separately from the extracted symbol, and outputting the processed supplementary payload data as received supplementary-channel data.

Another embodiment takes the form of a system that includes a communication interface, a processor, and data storage containing instructions executable by the processor for causing the system to carry out at least the functions described in the preceding paragraph.

Moreover, any of the variations and permutations described in the ensuing paragraphs and anywhere else in this disclosure can be implemented with respect to any embodiments, including with respect to any method embodiments and with respect to any system embodiments.

In at least one embodiment, obtaining the primary data signal includes receiving the primary data signal.

In at least one embodiment, obtaining the primary data signal includes generating the primary data signal.

In at least one embodiment, the primary data signal includes an OFDM signal.

In at least one embodiment, the primary data signal includes an LTE signal.

In at least one embodiment, obtaining the supplementary payload data includes receiving the supplementary payload data.

In at least one embodiment, obtaining the supplementary payload data includes generating the supplementary payload data.

In at least one embodiment, the supplementary payload data is modulated using at least one modulation technique. In at least one such embodiment, the at least one modulation technique includes at least one Zadoff-Chu modulation technique. In at least one other such embodiment, the at least one modulation technique includes at least one binary phase shift keying (BPSK) modulation technique. In at least one other such embodiment, the at least one modulation technique includes at least one quadrature phase shift keying (QPSK) modulation technique. In at least one other such embodiment, the at least one modulation technique includes at least one quadrature amplitude modulation (QAM) technique.

In at least one embodiment, the process further includes generating the given symbol at least in part by prepending the given cyclic prefix to the primary payload data. In at least one such embodiment, obtaining the primary payload data includes receiving the primary payload data. In at least one other such embodiment, obtaining the primary payload data includes generating the primary payload data.

In at least one embodiment, the subset of the supplementary payload data includes all of the supplementary payload data.

In at least one embodiment, the subset of the supplementary payload data does not include all of the supplementary payload data.

In at least one embodiment, the given cyclic prefix is delineated into a first number of sequential prefix samples that are each of a sample-period duration, and the subset of the supplementary payload data is delineated into a second number of sequential supplementary-data samples that are each of the sample-period duration, where the second number is less than the first number. In at least one such embodiment, replacing the initial portion of the given cyclic prefix with the subset of the supplementary payload data includes replacing the initial second number of sequential prefix samples in the given cyclic prefix with the second number of sequential supplementary-data samples from the subset of the supplementary payload data. In at least one such embodiment, the sample-period duration corresponds to a sampling rate of 30.72 MHz. In at least one other such embodiment, the second number is 16.

In at least one embodiment, the primary data signal includes one or more other symbols in addition to the given symbol, where each of the one or more other symbols includes respective primary payload data prepended by a respective cyclic prefix. In at least one such embodiment, the given symbol is sequentially first among the symbols in the primary data signal. In at least one other such embodiment, the given symbol is not sequentially first among the symbols in the primary data signal. In at least one other such embodiment, generating the modified primary data signal further includes replacing a respective initial portion of the respective cyclic prefix of one or more of the one or more other symbols in the primary data signal with a respective subset of the supplementary payload data. In at least one other such embodiment, generating the modified primary data signal further includes replacing a respective initial portion of the respective cyclic prefix of each of the one or more other symbols in the primary data signal with a respective subset of the supplementary payload data.

In at least one embodiment, the process further includes identifying a duration value, and also includes identifying the initial portion of the given cyclic prefix as being that part of the given cyclic prefix that (i) extends from the beginning of the given cyclic prefix and (ii) has a duration equal to the identified duration value. In at least one such embodiment, the primary data signal includes one or more other symbols in addition to the given symbol, and each of the one or more other symbols includes respective primary payload data prepended by a respective cyclic prefix. In at least one such embodiment, identifying the duration value includes determining a delta by which a duration of the given cyclic prefix exceeds a duration of the respective cyclic prefix of at least one of the other symbols in the primary data signal, and also includes setting the duration value to be equal to the determined delta. In at least one such embodiment, the duration value equals about 0.52 microseconds.

In at least one embodiment, the process further includes obtaining a second primary data signal that includes a given second symbol, where the given second symbol includes second primary payload data prepended with a given second cyclic prefix; the process further includes generating a modified second primary data signal at least in part by replacing an initial portion of the given second cyclic prefix with a second subset of the supplementary payload data, and still further includes outputting the generated modified second primary data signal for transmission via the air interface. In at least one such embodiment, the second subset is the same as the subset. In at least one other such embodiment, the subset and the second subset contain different respective portions of the supplementary payload data; in at least one such embodiment, the different portions are sequential in the supplementary payload data; in at least one other such embodiment, the different portions are mutually exclusive.

In at least one embodiment, the supplementary payload data corresponds to a supplementary direct-mode channel. In at least one such embodiment, the supplementary direct-mode channel is a supplementary voice channel.

In at least one embodiment, the supplementary payload data corresponds to an emergency beacon.

In at least one embodiment, the supplementary payload data corresponds to a control signal for communication between base stations. In at least one such embodiment, the base stations are IAN base stations.

In at least one embodiment, transmission via the air interface includes transmission during an LTE time slot.

In at least one embodiment, the process further includes transmitting the generated modified primary data signal via the air interface.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . ." And it is for reasons akin to brevity and clarity of presentation that this implied leading clause is not repeated ad nauseum in this detailed description.

FIG. 1 depicts an example communication system, in accordance with an embodiment. In particular, FIG. 1 depicts an example communication system 100 that includes one or more commercial RANs 102, a public-safety RAN 104, a data network 106, a circuit network 108, WCDs 110, and communication links 112-126.

An example commercial RAN 102 is discussed below in connection with FIG. 2, though in general, each RAN 102 and the RAN 104 includes typical RAN elements such as base stations, base station controllers, routers, switches, and the like, arranged, connected, and programmed to provide wireless service to user equipment (e.g., WCDs 110) in a manner known to those of skill in the relevant art.

The public-safety RAN 104 may include one or more packet-switched networks and/or one or more circuit-switched networks, and in general functions to provide one or more public-safety agencies with any necessary computing and communication needs. Thus, the public-safety RAN 104 may include a dispatch center communicatively connected with the data network 106 and also with the circuit network 108, for retrieving and transmitting any necessary public-safety-related data and communications. The public-safety RAN 104 may also include any necessary computing, data-storage, and data-presentation resources utilized by public-safety personnel in carrying out their public-safety functions. Moreover, the public-safety RAN 104 may include one or more network access servers (NASs), gateways, and the like for bridging communications to one or more other entities and/or networks, such as the commercial RANs 102, the data network 106, and the circuit network 108, as representative examples.

The data network 106 may be, include, or be a part of the global network of networks typically referred to as the Internet. The data network 106 may be a packet-switched network, and entities (i.e., servers, routers, computers, and the like) that communicate over the data network 106 may be identified by a network address such as an Internet Protocol (IP) address. Moreover, the data network 106 may include one or more NASs, gateways, and the like for bridging communications to one or more other entities and/or networks, such as the commercial RANs 102, the public-safety RAN 104, and the circuit network 108, as representative examples.

The circuit network 108 may be, include, or be a part of the circuit-switched telephone network commonly referred to as the public switched telephone network (PSTN), and in general functions to provide circuit-switched communications to various communication entities as is known in the relevant art. Moreover, the circuit network 108 may include one or more NASs, gateways, and the like for bridging communications to one or more other entities and/or networks, such as the commercial RANs 102, the public-safety RAN 104, and the data network 106, as representative examples.

The depicted example communication system 100 includes communication links 112-126, any one or more of which could include one or more wireless-communication links and/or one or more wired-communication links. In FIG. 1, the communication links 112 and 114 are depicted with respective lightning-bolt graphics; while this graphic typically denotes wireless communication, and does in this example as well, this is not to the exclusion of one or more of the other communication links 116-126 being or at least including wireless-communication links as well.

The WCDs 110 may be any suitable computing and communication devices configured to engage in wireless communication with one or both of one or more of the RANs 102 over the air interface 112 as is known to those in the art and the public-safety RAN 104 over the air interface 114 as is known to those in the art. Some example WCDs 110 are discussed below in connection with the various figures.

As can be seen in FIG. 1, the communication link 112 (as mentioned above) connects the commercial RANs 102 and the WCDs 110, the communication link 114 (as mentioned above) connects the public-safety RAN 104 and the WCDs 110, the communication link 116 connects the commercial RANs 102 and the public-safety RAN 104, the communication link 118 connects the commercial RANs 102 and the data network 106, the communication link 120 connects the commercial RANs 102 and the circuit network 108, the communication link 122 connects the public-safety RAN 104 and the data network 106, the communication link 124 connects the data network 106 and the circuit network 108, and the communication link 126 connects the public-safety RAN 104 and the circuit network 108. This arrangement is provided purely by way of example, as other arrangements could be implemented by those of skill in the relevant art in various different contexts.

Figure 2:
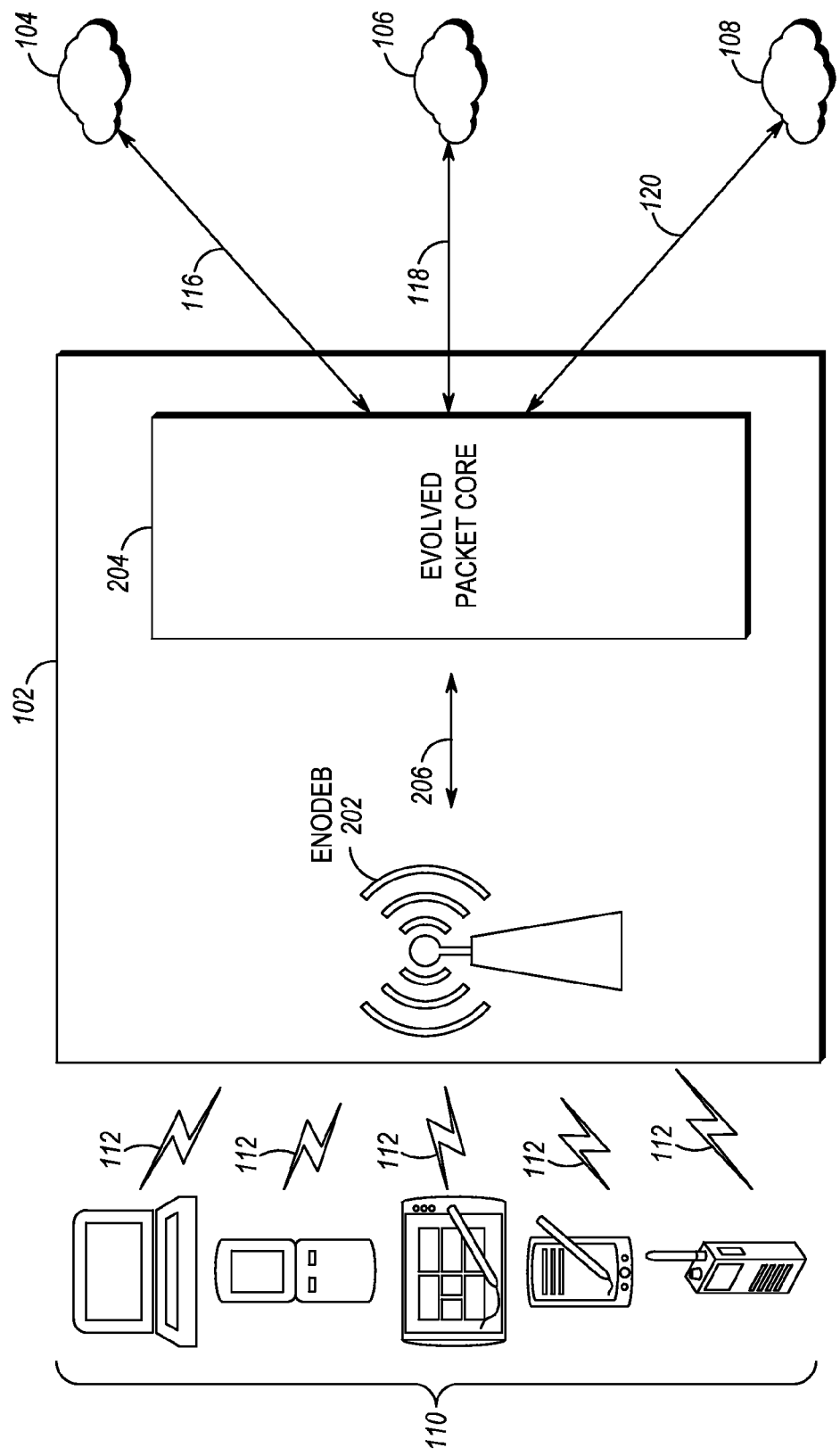
FIG. 2 depicts a first example of aspects of the communication system of FIG. 1, in accordance with an embodiment.

FIG. 2 depicts a first example of aspects of the communication system of FIG. 1, in accordance with an embodiment. FIG. 2 depicts the communication system 100 of FIG. 1, though in more detail regarding some example WCDs 110 and an example commercial RAN 102, although a similar figure could be depicted with the example public-safety RAN 104 instead of the example commercial RAN 102. In particular, FIG. 2 depicts the RAN 102 as including an eNodeB 202, which communicates directly or indirectly with an evolved packet core (EPC) 204 over a communication link 206. As is the case with each of the links mentioned above, and as is the case with any of the links mentioned anywhere else in this disclosure, the communication link 206 may be or include one or more wireless-communication links and/or one or more wired-communication links, as deemed suitable by those of skill in the relevant art in a given context.

In at least one embodiment, the eNodeB 202 includes the hardware and software (and/or firmware) necessary for the eNodeB 202 to function as an eNodeB, a NodeB, a base station, a base transceiver station (BTS), a WiFi access point, and/or the like, as known to those having skill in the relevant art. In some instances, the eNodeB 202 in the example RAN 102 also includes functionality typically associated in the art with entities that are often referred to by terms such as base station controllers (BSCs), radio network controllers (RNCs), and the like. Also, while one eNodeB 202 is depicted by way of example in FIG. 2, any suitable number of eNodeBs could be deployed as deemed suitable by those of skill in the relevant art.

In general, the eNodeB 202 is an entity that, on one side (i.e., the wireless-network side (interface)), engages in wireless communications over the air interface 112 with one or more WCDs 110 according to a protocol such as LTE or the like and, on the other side (i.e., the "backhaul" side), engages in communications with the EPC 204 via the communication link 206, to facilitate communications between various WCDs 110 and networks such as the networks 104, 106, and 108.

The EPC 204 may include one or more network entities such as one or more mobility management entities (MMEs), one or more serving gateways (SGWs), one or more packet data network (PDN) gateways (PGWs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to the WCDs 110 via the eNodeB 202, and to bridge such wireless service with various transport networks. In general, a commercial RAN and a public-safely RAN may each provide wireless service according to a protocol such as LTE, WiFi, APCO P25, and/or the like. These examples are provided for illustration and not by way of limitation; moreover, those of skill in the art are aware of variations among different protocols and among different implementations of a given protocol, and of similarities across different protocols.

Figure 3:
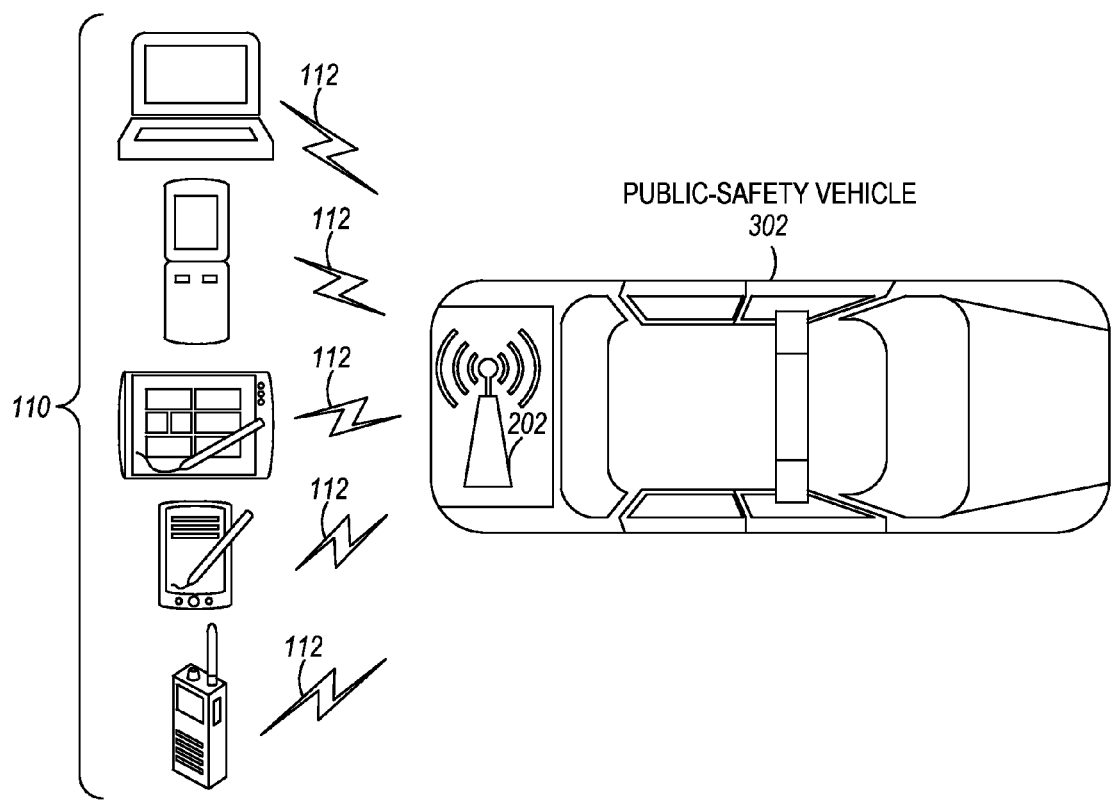
FIG. 3 depicts a second example of aspects of the communication system of FIG. 1, in accordance with an embodiment.

FIG. 3 depicts a second example of aspects of the communication system of FIG. 1, in accordance with an embodiment. In this figure, the eNodeB 202 is depicted as being a mobile eNodeB connected to a public-safety vehicle 302. The public-safety vehicle 302 in conjunction with the eNodeB 202 can be used to establish an IAN, which in at least one embodiment provides local WCDs 110 with respective wireless-communication links to (or as part of) the public-safety RAN 104. In this example, the eNodeB 202 can be positioned and repositioned where needed by driving the public-safety vehicle 302 to various incident locations. If an incident occurs in a place where there is no wireless service, the public-safety vehicle 302 can be driven to that area to facilitate its accompanying mobile eNodeB being used by nearby WCDs 110.

Figure 4:
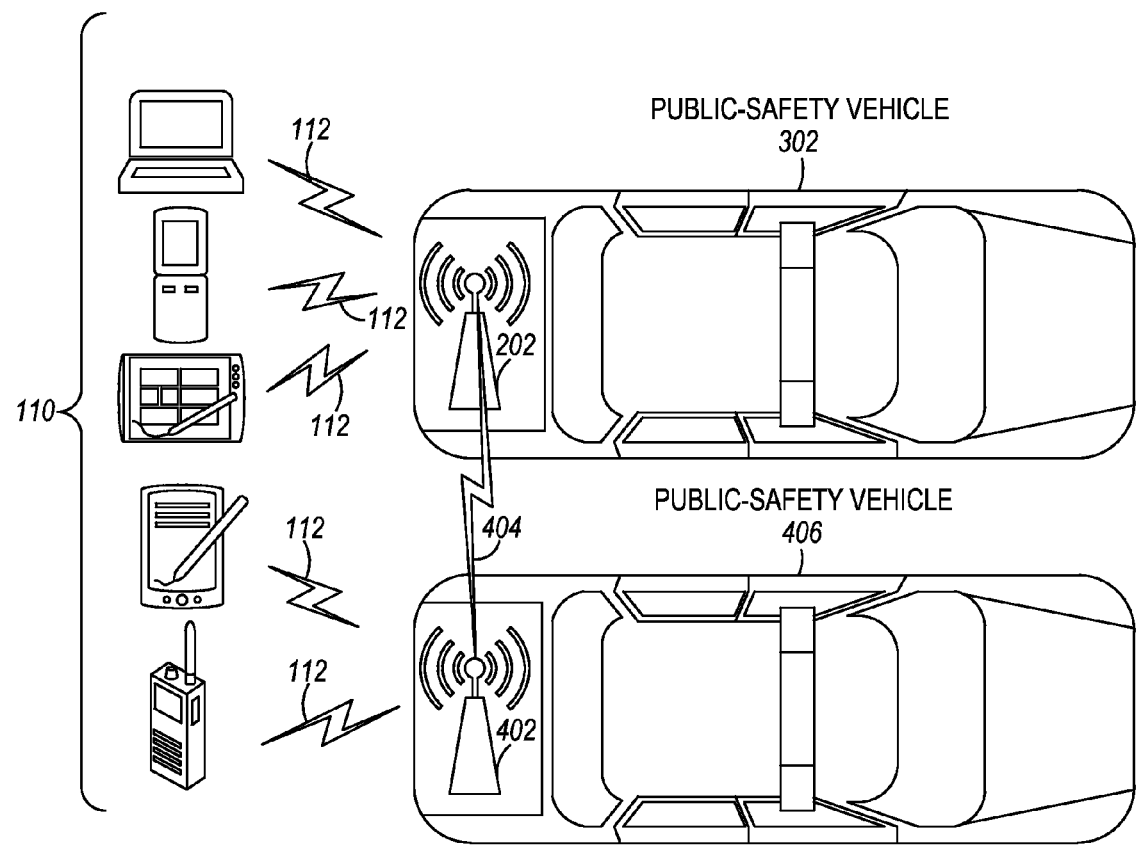
FIG. 4 depicts a third example of aspects of the communication system of FIG. 1, in accordance with an embodiment.

FIG. 4 depicts a third example of aspects of the communication system of FIG. 1, in accordance with an embodiment. The scenario that is depicted in FIG. 4 can be described as an evolution from the scenario that is depicted in FIG. 3, where at least one difference is the arrival of a second public-safety vehicle 406 having connected thereto a respective mobile eNodeB 402. The mobile eNodeBs 202 and 402 can be thought of as being two separate IANs, or as being part of the same IAN. Either way, coordinating communication between the mobile eNodeBs 202 and 402 can be advantageous for reasons such as non-interference and load balancing, among numerous other reasons that could be listed here. Such coordination communication could take place via a control channel, and could traverse a communication path between the two mobile eNodeBs 202 and 402 that is indirect (e.g., that involves a network and respective backhaul links of the mobile eNodeBs 202 and 402) or direct (i.e. and e.g., via a communication link 404).

The communication link 404 that is depicted in FIG. 4 may be or include a control channel in one or both directions between the mobile eNodeBs 202 and 402, making use—again, in one or both directions—of a supplementary data channel in accordance with the present methods and systems. Some other possible uses for such a supplementary data channel include using such a channel as a control channel for other purposes (e.g., for communication between a base station and a WCD 110), as a supplementary direct-mode (e.g., voice) channel, as an emergency beacon, and/or as one or more other channel types deemed suitable by those of skill in the art for a given implementation or in a given context. Moreover, a supplementary data channel in accordance with the present disclosure could be implemented from a base station, to a base station, from a WCD 110, to a WCD 110, and/or as part of any other implementation deemed suitable by those of skill in the art.

Figure 5:
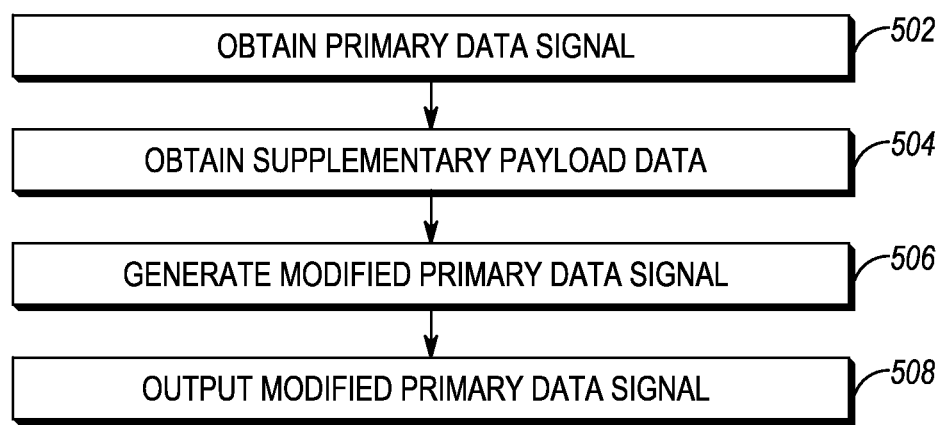
FIG. 5 depicts a first example process, in accordance with an embodiment.

FIG. 5 depicts a first example process, in accordance with an embodiment. In particular, FIG. 5 depicts an example process 500 that is described below as being carried out by a mobile eNodeB such as the mobile eNodeB 202 or the mobile eNodeB 402. This manner of description is by way of example and not limitation, as any suitably equipped, programmed, and configured system (i.e., device or combination of devices) could carry out the example process 500 that is described in connection with FIG. 5 and/or the example process 1000 that is described in connection with FIG. 10. Such a system may include a communication interface, a processor, and data storage containing instructions executable by the processor for causing the system to carry out at least the described functions.

As can be seen in FIG. 5, in carrying out the example process 500, at step 502, the mobile eNodeB obtains a primary data signal, which includes a given symbol. The given symbol includes primary payload data prepended with a given cyclic prefix. At step 504, the mobile eNodeB obtains supplementary payload data. At step 506, the mobile eNodeB generates a modified primary data signal at least in part by replacing an initial portion of the given cyclic prefix with a subset of the supplementary payload data. At step 508, the mobile eNodeB outputs the generated modified primary data signal for transmission via an air interface. These steps are further described below.

At step 502, the mobile eNodeB obtains a primary data signal, which includes a given symbol. The given symbol includes primary payload data prepended with a given cyclic prefix (CP). In at least one embodiment, obtaining the primary data signal includes receiving the primary data signal. In at least one embodiment, obtaining the primary data signal includes generating the primary data signal; in at least one such embodiment, the mobile eNodeB generates the primary data signal at least in part by prepending the given symbol with the given CP. In general, the mobile eNodeB may receive or generate any one or more of the primary data signal, the given symbol, the given CP, the primary payload data, and the supplementary payload data. In at least one embodiment, the primary data signal includes an OFDM signal. In at least one embodiment, the primary data signal includes an LTE signal.

Figure 6:
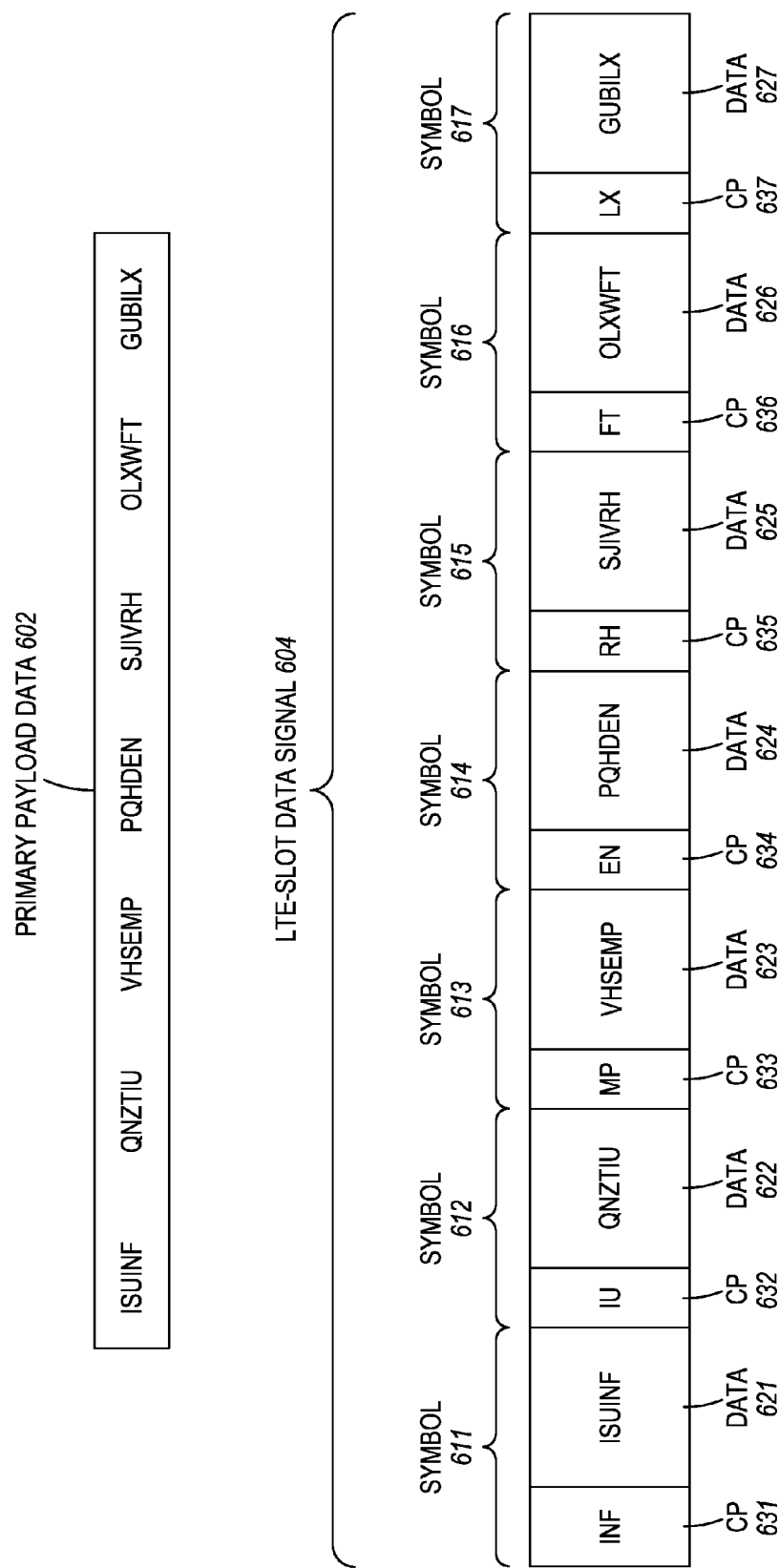
FIG. 6 depicts example primary payload data and an example LTE-slot data signal, in accordance with an embodiment.

FIG. 6 depicts example primary payload data and an example LTE-slot data signal, in accordance with an embodiment. The example primary payload data 602 reads "ISUINF QNZTIU VHSEMP PQHDEN SJIVRH OLXWFT GUBILX". In FIGS. 6-9, the various examples of primary payload data are depicted using capital letters of the English alphabet, while the various examples of supplementary payload data are depicted using lowercase letters of the Greek alphabet. These depictions are provided purely by way of example and not limitation. They are chosen arbitrarily for illustration purposes only.

In at least one embodiment, the obtained primary data signal takes the form of an LTE-slot data signal such as the LTE-slot data signal 604 that is depicted in FIG. 6. The example LTE-slot data signal 604 contains seven symbols 611-617, each of which includes respective primary payload data 621-627 prepended with a respective CP 631-637. In LTE, each time slot has a duration of 0.5 ms. In order to align on 0.5-ms boundaries, the first symbol time slot 611 lasts approximately 0.0719 ms, while each of the following six symbols 612-617 last approximately 0.0713 ms.

In a typical LTE implementation, each of the seven payload-data portions 621-627 are of the same duration as one another, each of the second through seventh CPs 632-637 are of the same duration as one another, and the first CP 631 has a greater duration (i.e., is a longer CP) than each of the second through seventh CPs 632-637. This is represented in FIG. 6 by each of the CPs 632-637 being two characters long, and in particular being copies of the last two characters of the corresponding payload-data portion 622-637 (e.g., the payload-data portion 624 ("PQHDEN" is prepended by the CP 634 ("EN")), while the first payload-data portion 621 ("ISUINF") is prepended by the CP 631 ("INF"), which is three characters long ("INF"), and in particular is a copy of the last three characters of the first payload-data portion 621.

At step 504, the mobile eNodeB obtains supplementary payload data. The mobile eNodeB can receive or generate the supplementary payload data, or perhaps carry out a combination thereof. In at least one embodiment, the supplementary payload data is modulated using at least one modulation technique such as BPSK, QPSK, QAM, and/or one or more others known to those in the art. The supplementary payload data may be communicated in the form of one or more Zad-off-Chu sequences. For example, a given root sequence can be used to represent a binary "0" and a cyclically shifted version of the same root sequence can be used to represent a binary "1". And certainly other example implementations could be listed here.

At step 506, the mobile eNodeB generates a modified primary data signal at least in part by replacing an initial portion of the given CP with a subset of the supplementary payload data that was obtained at step 504. Various examples of step 506 are described below in connection with FIGS. 7-9.

Figure 7:
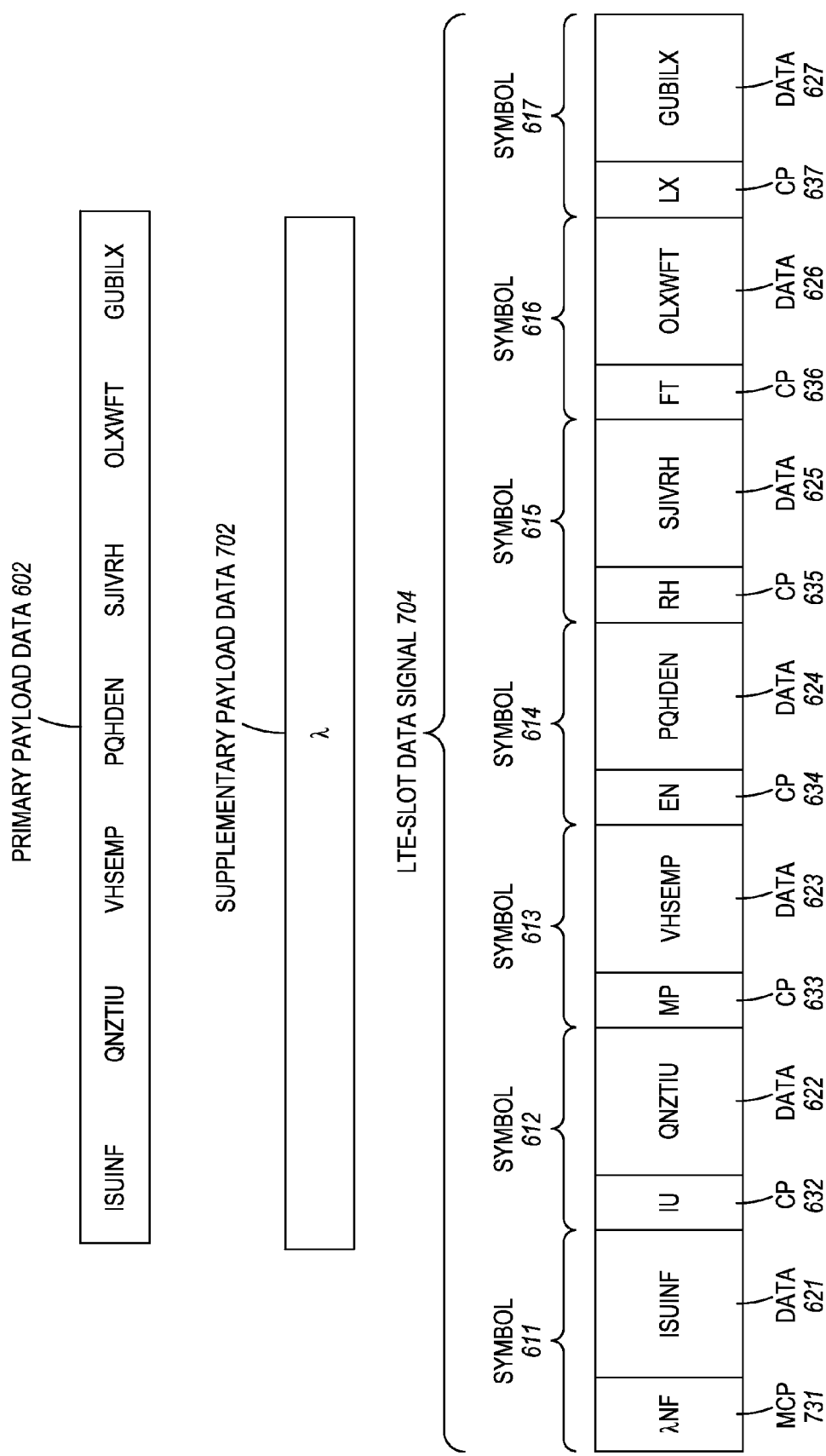
FIG. 7 depicts the example primary payload data of FIG. 6, first example supplementary payload data, and a first example modified LTE-slot data signal, in accordance with an embodiment.

FIG. 7 depicts the example primary payload data of FIG. 6, first example supplementary payload data, and a first example modified LTE-slot data signal, in accordance with an embodiment. That is, FIG. 7 depicts the primary payload data 602 of FIG. 6, example supplementary payload data 702 (that is represented as "λ"), and an example modified LTE-slot data signal 704. It can be seen by inspection that the modified LTE-slot data signal 704 matches the LTE-slot data signal 604 in all aspects other than that the modified CP (MCP) 731 ("λNF") is present instead of the CP 631 ("INF"). An initial portion ("I") of the CP 631 ("INF") has been replaced by at least some—in this case all—of the supplementary payload data 702 ("λ").

In at least one embodiment, the given CP is delineated into a first number (e.g., 160) of sequential prefix samples that are each of a sample-period duration (which may correspond to a sampling rate of 30.72 MHz), and the subset of the supplementary payload data is delineated into a second number (e.g., 16) of sequential supplementary-data samples that are each of the same sample-period duration. In such an embodiment, replacing the initial portion of the given CP with the subset of the supplementary payload data includes replacing the initial second number of (e.g., the initial 16) sequential prefix samples in the given CP with the second number of (e.g., with 16) sequential supplementary-data samples from the subset of the supplementary payload data. Such an embodiment may correspond to an implementation in which unmodified time-slot signals use a 160-sample CP for the first symbol in the time slot and a 144-sample CP for each of the second through seventh symbols. In such an implementation, it is evident that a 144-sample CP is sufficient to achieve a certain reliability and quality of transfer of a given symbol, thus making the first 16 samples (which in some embodiments corresponds to approximately 0.52 microseconds) an extra resource that is identified and utilized in accordance with the present methods and systems.

As is the case with the LTE-slot data signal 604, it is often the case that the primary data signal includes one or more other symbols in addition to the given symbol, where—like the given symbol—each of the one or more other symbols includes primary payload data prepended by a respective CP. In at least one such embodiment, the given symbol (i.e., the symbol whose respective CP is modified to include some or all of the supplementary payload data) is sequentially first among the symbols in the primary data signal; the example described above in connection with FIG. 7 is such an embodiment. In other such embodiments, the given symbol is not sequentially first among the symbols in the primary data signal.

Moreover, in at least one embodiment in which the primary data signal includes one or more other symbols in addition to the given symbol, the mobile eNodeB—in addition replacing an initial portion of the given CP with a subset of the supplementary payload data—replaces respective initial portions of one, some, or all of the respective CPs of the one or more other symbols with a respective subset of the supplementary payload data. Each such subset could be the same data, perhaps to increase reliability by way of redundancy. Instead, each such subset could be different (perhaps mutually exclusive, perhaps sequential) subsets of the supplementary payload data; an example of this type is described below in connection with FIG. 8.

Figure 8:
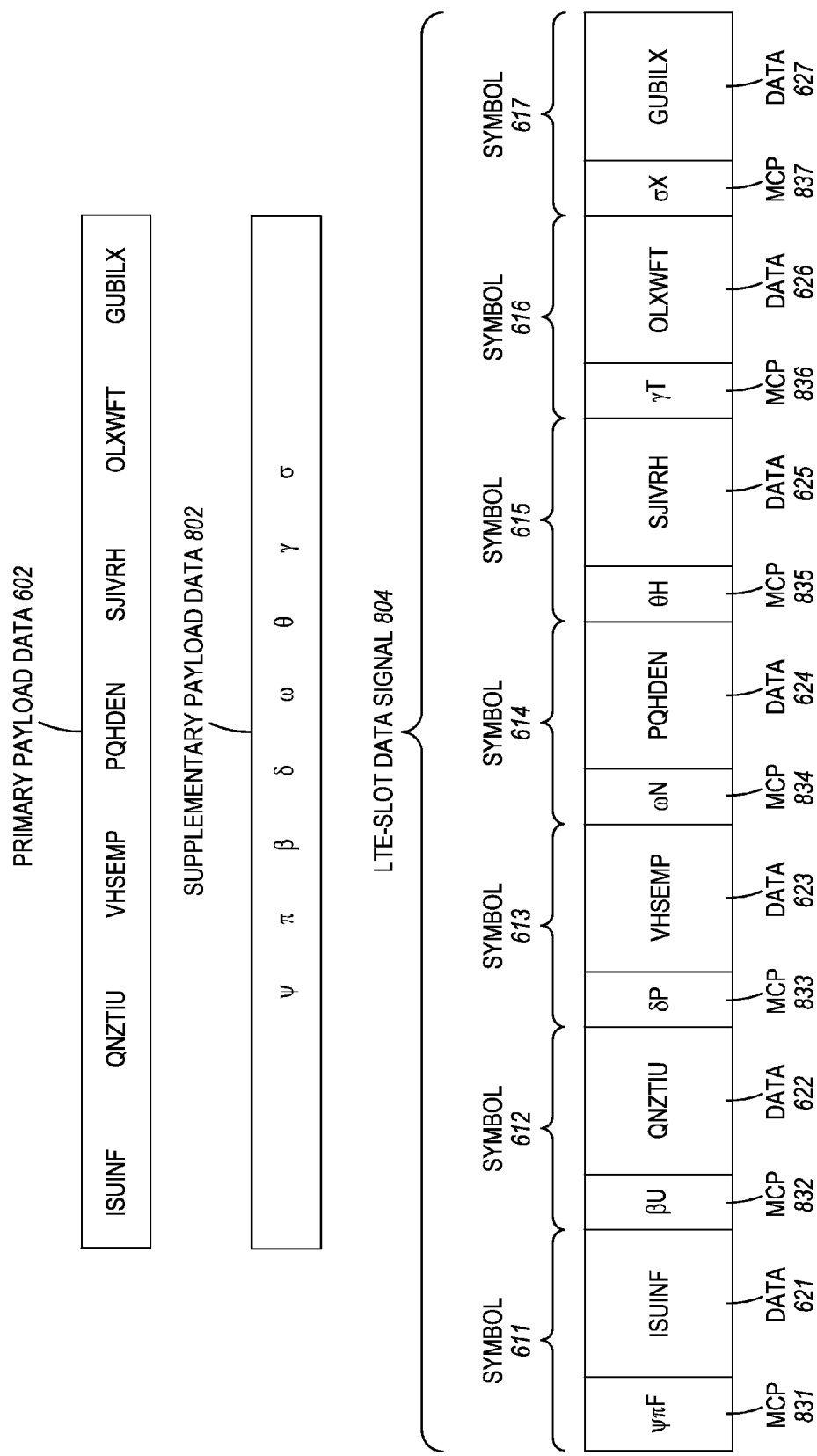
FIG. 8 depicts the example primary payload data of FIG. 6, second example supplementary payload data, and a second example modified LTE-slot data signal, in accordance with an embodiment.

FIG. 8 depicts the example primary payload data of FIG. 6, second example supplementary payload data, and a second example modified LTE-slot data signal, in accordance with an embodiment. In particular, FIG. 8 depicts the primary payload data 604 of FIG. 6, supplementary payload data 802 ("ψ π β δ ω θ γ σ"), and a modified LTE-slot data signal 804. Like the modified LTE-slot data signal 704 of FIG. 7, the modified LTE-slot data signal 804 of FIG. 8 is a result of a modification of the LTE-slot data signal 604 of FIG. 6. The modified LTE-slot data signal 804 matches the LTE-slot data signal 604 other than that the signal 804 includes MCPs 831-837 rather than (unmodified) CPs 631-637. In the depicted example, the CP 631 ("INF") is modified into the MCP 831 ("ψπF"), the CP 632 ("IU") is modified into the MCP 832 ("βU"), the CP 633 ("MP") is modified into the MCP 833 ("δP"), the CP 634 ("EN") is modified into the MCP 834 ("ωN"), the CP 635 ("RH") is modified into the MCP 835 ("θH"), the CP 636 ("FT") is modified into the MCP 836 ("γT"), and the CP 637 ("LX") is modified into the MCP 837 ("σX").

Moreover, in some embodiments, in addition to or instead of replacing an initial portion of the respective CPs of multiple symbols in a given time slot, the mobile eNodeB replaces an initial portion of one or more respective CPs of symbols in multiple time slots with respective subsets of the supplementary payload data. In one such embodiment, the mobile eNodeB replaces an initial portion of the respective CPs of the respective first symbols in multiple (perhaps consecutive) time slots with subsets of the supplementary payload data. These subsets could be the same (for redundancy) or different (perhaps sequential, perhaps mutually exclusive). An example where the respective subsets are different from one another, and where the respective subsets replace initial portions of CPs of initial symbols of successive LTE-slot data signals, is described below in connection with FIG. 9.

Figure 9:
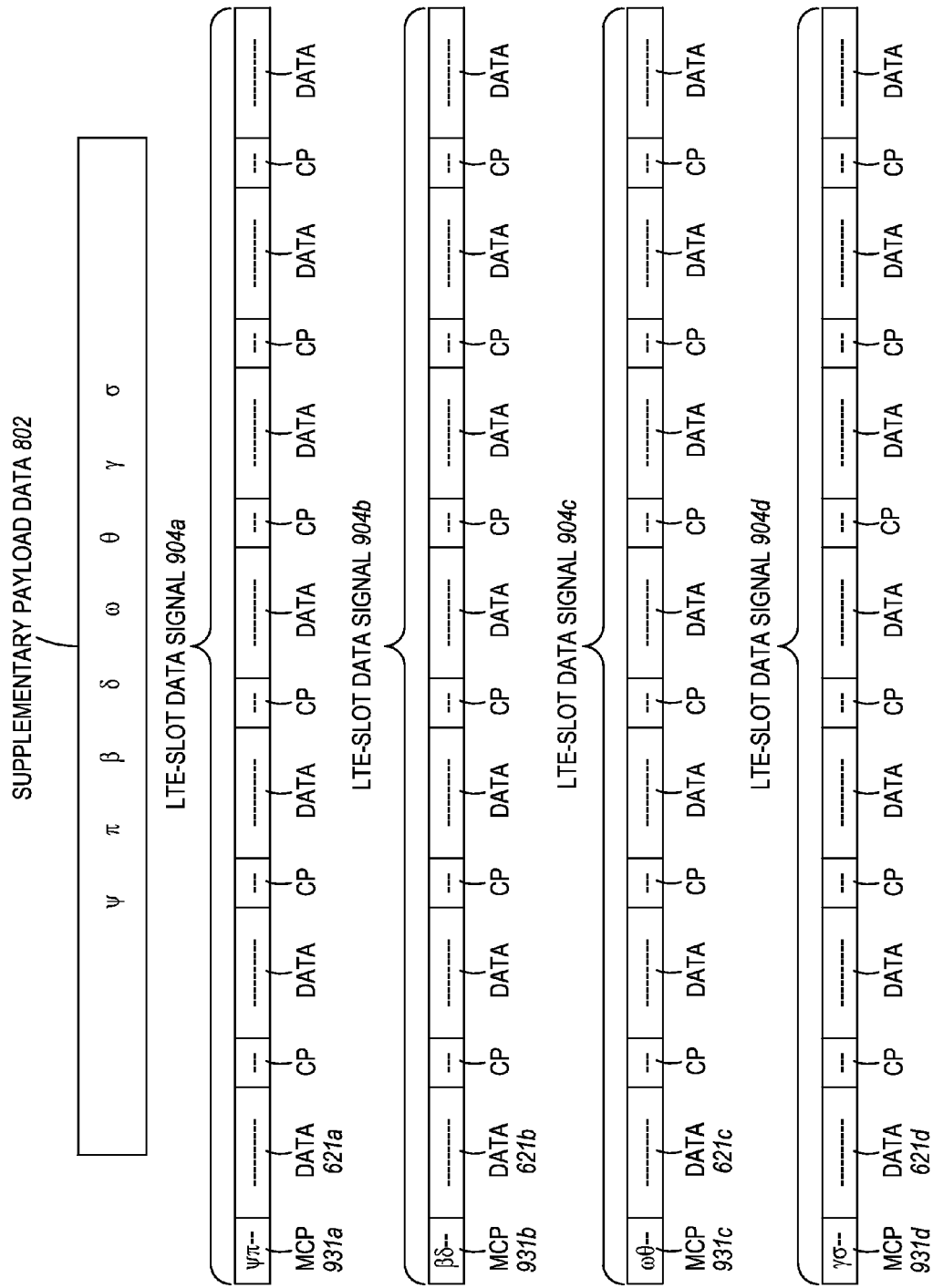
FIG. 9 depicts the second example supplementary payload data of FIG. 8 and an example plurality of modified LTE-slot data signals, in accordance with an embodiment.

FIG. 9 depicts the second example supplementary payload data of FIG. 8 and an example plurality of modified LTE-slot data signals, in accordance with an embodiment. In particular, FIG. 9 depicts the example supplementary payload data 802 of FIG. 8, as well as four modified primary LTE-slot data signals 904a-d. Each of the modified LTE-slot data signals 904a-d contains a corresponding MCP 931a-d containing a respective portion of the example supplementary payload data 802. To wit, MCP 931a has had its initial portion replaced by "ψπ," MCP 931b has had its initial portion replaced by "βδ," MCP 931*c* has had its initial portion replaced by "ωθ," and MCP 931*d* has had its initial portion replaced by "γσ."

Moreover, it is noted that, with respect to this and the other embodiments, the particular supplementary payload data that replaces an initial part of the CP of a given symbol does not become part of the CP of that symbol. Rather, the particular supplementary payload data precedes what has then become a shorter CP than was there prior to the replacement. On the receiver side, as discussed below in connection with FIG. 10, the particular supplementary payload data is processed as being received in a supplementary data channel, while the then-shorter CP is processed in conjunction with its ensuing symbol in the manner known to those of skill in the relevant art.

In at least one embodiment, the mobile eNodeB determines a duration of a modifiable initial portion of a given CP—i.e., the initial portion that the mobile eNodeB will then proceed to replace with supplementary payload data in accordance with the present methods and systems—at least in part by determining a difference (i.e., a delta) in duration between a CP prepended to, e.g., the first symbol of an LTE-slot data signal and a CP prepended to, e.g., a non-first symbol of the data signal. As such, in at least one embodiment, the mobile eNodeB identifies a duration value (e.g., 16 samples), and also identifies the initial portion of the given cyclic prefix as being that part of the given cyclic prefix that (i) extends from the beginning of the given cyclic prefix and (ii) has a duration equal to the identified duration value. In at least one such embodiment, identifying the duration value (e.g., 16 samples) includes determining a delta by which a duration of the given cyclic prefix (e.g., 160 samples) exceeds a duration of the respective cyclic prefix (e.g., 144 samples) of at least one of the other symbols in the primary data signal; and setting the duration value equal to the determined delta (i.e., 16 samples). And certainly other possible example implementations could be listed here.

At step 508, the mobile eNodeB outputs (e.g., to its transmitter, to data storage, and/or to one or more other entities and/or locations deemed suitable by those of skill in the relevant art) the generated modified primary data signal (and perhaps additional modified primary data signals (e.g., signals 904*a-d*)) for transmission via an air interface. In at least one embodiment, the mobile eNodeB also transmits the generated modified data signal (or signals) via the air interface, perhaps during an LTE time slot (or during multiple respective LTE time slots in examples involving multiple modified data signals).

Figure 10:
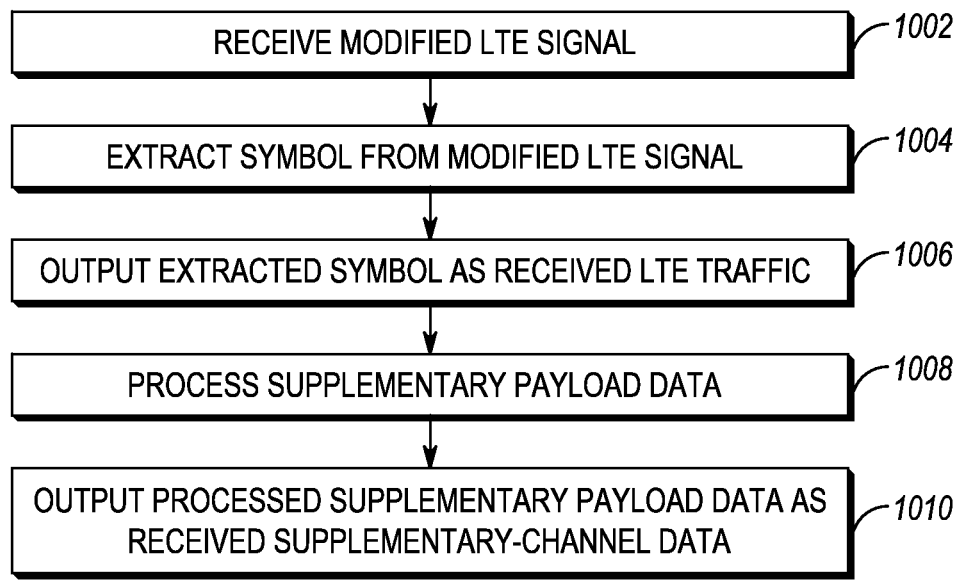
FIG. 10 depicts a second example process, in accordance with an embodiment.

FIG. 10 depicts a second example process, in accordance with an embodiment. In particular, FIG. 10 depicts an example process 1000 that may be carried out on the receiver side in situations where another entity is carrying out a process such as the above-described example process 500 on the corresponding transmitter side. The example process 1000 could be carried out by a mobile eNodeB such as the mobile eNodeB 202 or 402, by a handheld mobile radio or other WCD, and/or by any other receiving device that is suitably equipped, programmed, and configured to carry out the steps of the example process 1000. By way of example and not limitation, the process 1000 is described here as being carried out by a WCD.

At step 1002, the WCD receives via an air interface a modified LTE signal that includes a symbol. The symbol is prepended with a shortened cyclic prefix that is preceded by supplementary payload data. At step 1004, the WCD extracts the symbol from the received modified LTE signal. At step 1006, the WCD outputs the extracted symbol as received LTE traffic; in at least one embodiment, the WCD carries out step 1006 at least in part by providing the extracted symbol to a first process running at the WCD; in at least one embodiment, the WCD carries out step 1006 at least in part by saving the extracted symbol to a first memory, cache, or other data storage; and certainly other possibilities could be listed as well. At step 1008, the WCD processes the supplementary payload data separately from the extracted symbol (e.g., using a separate received-data buffer or other cache or storage). At step 1010, the WCD outputs the processed supplementary payload data as received supplementary-channel data; in at least one embodiment, the WCD carries out steps 1008 and 1010 at least in part by providing the received supplementary-channel data to a second process running at the WCD; in at least one embodiment, the WCD carries out step 1006 at least in part by saving the received supplementary-channel data to a second memory, cache, or other data storage; and certainly other possibilities could be listed as well.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 1%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method for embedding supplementary data channels in a communication system including a processor, the method comprising:
   obtaining, by the processor, a primary data signal, the primary data signal including a given symbol, the given symbol including primary payload data prepended with a given cyclic prefix delineated into a first number of sequential prefix samples that are each of a sample-period duration;
   obtaining, by the processor, supplementary payload data;
   generating, by the processor, a modified primary data signal; and
   outputting, by the processor, the generated modified primary data signal for transmission via an air interface;
   wherein:
      generating the modified primary data signal includes replacing, by the processor, an initial portion of the given cyclic prefix with a subset of the supplementary payload data delineated into a second number of sequential supplementary-data samples that are each of the sample-period duration, the second number being less than the first number; and
      replacing the initial portion of the given cyclic prefix with the subset of the supplementary payload data includes replacing, by the processor, an initial second number of sequential prefix samples in the given cyclic prefix with the second number of sequential supplementary-data samples from the subset of the supplementary payload data.

2. The method of claim 1, wherein the supplementary payload data is modulated using at least one modulation technique.

3. The method of claim 1, further comprising:
   generating, by the processor, the given symbol at least in part by prepending the given cyclic prefix to the primary payload data.

4. The method of claim 1, wherein the subset of the supplementary payload data includes all of the supplementary payload data.

5. The method of claim 1, wherein the subset of the supplementary payload data does not include all of the supplementary payload data.

6. The method of claim 1, wherein the primary data signal includes one or more other symbols in addition to the given symbol, each of the one or more other symbols including respective primary payload data prepended by a respective cyclic prefix.

7. The method of claim 6, wherein the given symbol is sequentially first among the symbols in the primary data signal.

8. The method of claim 6, wherein the given symbol is not sequentially first among the symbols in the primary data signal.

9. The method of claim 6, wherein generating the modified primary data signal further includes:
   replacing, by the processor, a respective initial portion of the respective cyclic prefix of one or more of the one or more other symbols in the primary data signal with a respective subset of the supplementary payload data.

10. The method of claim 6, wherein generating the modified primary data signal further includes:
    replacing, by the processor, a respective initial portion of the respective cyclic prefix of each of the one or more other symbols in the primary data signal with a respective subset of the supplementary payload data.

11. The method of claim 1, further comprising:
    obtaining, by the processor, a second primary data signal, the second primary data signal including a given second symbol, the given second symbol including second primary payload data prepended with a given second cyclic prefix;
    generating, by the processor, a modified second primary data signal, wherein generating the modified second primary data signal includes replacing an initial portion of the given second cyclic prefix with a second subset of the supplementary payload data; and
    outputting, by the processor, the generated modified second primary data signal for transmission via the air interface.

12. The method of claim 1, wherein the supplementary payload data corresponds to a supplementary direct-mode channel.

13. The method of claim 1, wherein the supplementary payload data corresponds to an emergency beacon.

14. The method of claim 1, wherein the supplementary payload data corresponds to a control channel for communication between base stations.

15. The method of claim 1, further comprising:
    transmitting, by the processor, the generated modified primary data signal via the air interface.

16. A system including:
    a communication interface;
    a processor; and
    data storage containing instructions executable by the processor for causing the system to carry out a set of functions, the set of functions including:
        obtaining a primary data signal, the primary data signal including a given symbol, the given symbol including primary payload data prepended with a given cyclic prefix delineated into a first number of sequential prefix samples that are each of a sample-period duration;
        obtaining supplementary payload data;
        generating a modified primary data signal; and
        outputting, via the communication interface, the generated modified primary data signal for transmission via an air interface;
    wherein:
        generating the modified primary data signal includes replacing an initial portion of the given cyclic prefix with a subset of the supplementary payload data delineated into a second number of sequential supplementary-data samples that are each of the sample-period duration, the second number being less than the first number; and
        replacing the initial portion of the given cyclic prefix with the subset of the supplementary payload data includes replacing an initial second number of sequential prefix samples in the given cyclic prefix with the second number of sequential supplementary-data samples from the subset of the supplementary payload data.

17. A method for embedding supplementary data channels in a communication system including a processor, the method comprising:
    obtaining, by the processor, a primary data signal, the primary data signal including a given symbol, the given symbol including primary payload data prepended with a given cyclic prefix;
    identifying, by the processor, a duration value;
    identifying, by the processor, an initial portion of the given cyclic prefix as being that part of the given cyclic prefix that (i) extends from the beginning of the given cyclic prefix and (ii) has a duration equal to the identified duration value;
    obtaining, by the processor, supplementary payload data;
    generating, by the processor, a modified primary data signal, wherein generating the modified primary data signal includes replacing, by the processor, the initial portion of the given cyclic prefix with a subset of the supplementary payload data; and
    outputting, by the processor, the generated modified primary data signal for transmission via an air interface.

18. The method of claim 17,
    wherein the primary data signal includes one or more other symbols in addition to the given symbol, each of the one or more other symbols including respective primary payload data prepended by a respective cyclic prefix; and
    wherein identifying the duration value includes:
        determining, by the processor, a delta by which a duration of the given cyclic prefix exceeds a duration of the respective cyclic prefix of at least one of the other symbols in the primary data signal; and
        setting, by the processor, the duration value equal to the determined delta.

* * * * *